US005834963A

United States Patent [19]

Weber

[11] Patent Number: 5,834,963

[45] Date of Patent: Nov. 10, 1998

[54] CIRCUIT CONFIGURATION FOR PARAMETER ADJUSTMENT

[75] Inventor: Stephan Weber, München, Germany

[73] Assignee: Siemens Aktiengesellschaft, Tunich, Germany

[21] Appl. No.: 858,818

[22] Filed: May 19, 1997

[30] Foreign Application Priority Data

May 17, 1996 [DE] Germany ........................ 196 20 033.4

[51] Int. Cl.[6] ........................ G06F 7/44

[52] U.S. Cl. ........................ 327/358; 356/538

[58] Field of Search ........................ 327/77, 80, 356, 327/357, 358, 359, 530, 532, 534, 535, 538, 540, 552

[56] References Cited

U.S. PATENT DOCUMENTS 5,465,044 11/1995 Matsumoto et al. .................... 327/356

FOREIGN PATENT DOCUMENTS

3404490C2 3/1995 Germany .

OTHER PUBLICATIONS

"Halbleiter–Schaltungstechnik", U. Tietze, Ch. Schenk, Springer–Verlag Berlin, 1990, pp. 348–351.

Electronic Circuits—Design and Applications, U. Tietze, Ch. Schenk, Springer–Verlag Berlin, Heidelberg, 1991, pp. 397–402.

*Primary Examiner*—Timothy P. Callahan
*Assistant Examiner*—Jeffrey Zweizig
*Attorney, Agent, or Firm*—Herbert L. Lerner; Laurence A. Greenberg

[57] ABSTRACT

A circuit configuration for parameter adjustment has one or more first analog multipliers which receive an input signals and a control signal which cooresponds to a parameter, and which output output signals. A second multiplier, which is identical to the first multiplier, receives a first reference signal and a second control signal which corresponds to the first control signal, and outputs an output signal. A regulating device compares the output signal of the second multiplier with a second reference signal and derives the control signals therefrom.

6 Claims, 1 Drawing Sheet

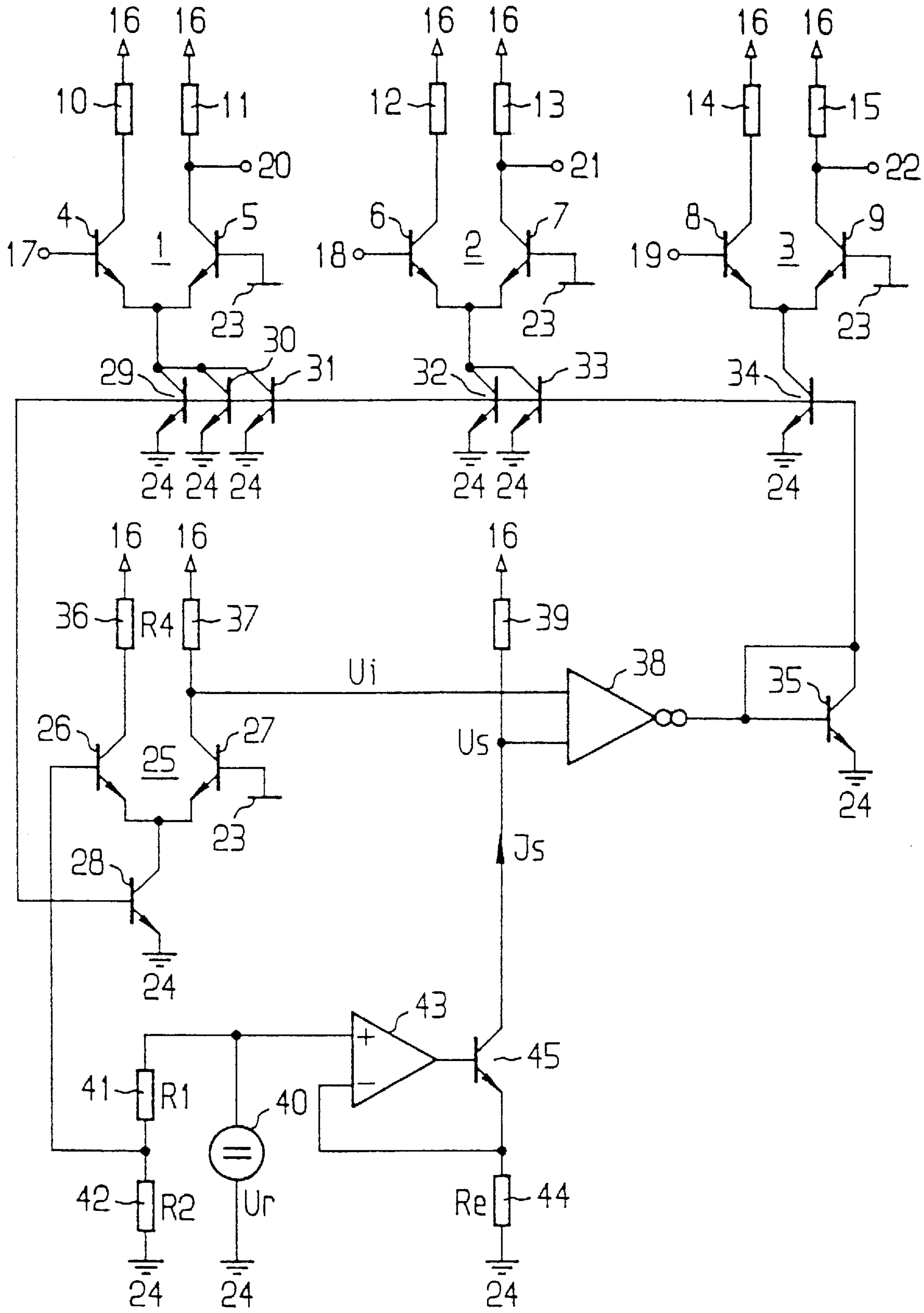
16
10
11
20
4
5
17
1
23
12
13
21
6
7
18
2
14
15
22
8
9
19
3
29
30
31
32
33
34
24
36
R4
37
39
Ui
38
26
27
25
Us
35
28
Js
43
45
41
R1
40
42
R2
Ur
Re
44

CIRCUIT CONFIGURATION FOR PARAMETER ADJUSTMENT

BACKGROUND OF THE INVENTION

1. Field of the Invention

The invention relates to a circuit configuration for parameter adjustment, having at least one first analog multiplier, to which an input signal and also a control signal which corresponds to a parameter are input and which outputs an output signal.

2. Description of the Related Art

The use of analog multipliers for adjusting parameters, in particular filter parameters, is proposed, for example, in U. Tietze, Ch. Schenk, Electronic Circuits—Design and Applications, Springer Verlag Berlin, Heidelberg 1991. On the one hand, exact setting of the desired parameters and, on the other hand, keeping the adjusted parameters constant are problematic in circuit configurations of this type. The parameters have usually been set to date by means of one external reference element per parameter to be set. If the circuit is an integrated circuit, the necessary high number of external reference elements and associated terminals in the integrated circuit is disadvantageous. As regards keeping the desired parameters constant, the multipliers used are individually designed in such a way that their properties are defined in an exact and constant manner by the respectively associated reference elements. The requisite circuitry is increased thereby.

SUMMARY OF THE INVENTION

It is accordingly an object of the invention to provide a circuit configuration for parameter adjustment, which overcomes the above-mentioned disadvantages of the heretofore-known devices and methods of this general type and which enables an exact and constant setting of parameters with little circuitry.

With the foregoing and other objects in view there is provided, in accordance with the invention, a circuit configuration for parameter adjustment, comprising:

at least one first analog multiplier connected to receive an input signal and a first control signal corresponding to a parameter, and outputting an output signal;

a second multiplier identical to the at least one first multiplier, the second multiplier being connected to receive a first reference signal and a second control signal corresponding to the first control signal, and outputting an output signal; and a regulating device connected to the at least one first multiplier and to the second multiplier, the regulating device receiving and comparing the output signal of the second multiplier and a second reference signal, a deriving therefrom control signals for the multipliers.

The circuit configuration according to the invention permits, for example, the setting of the cut-off frequency of an analog universal filter by means of a single external resistor, which saves terminals, costs and space, increases the accuracy and also affords high flexibility for the respective user.

In accordance with an added feature of the invention, there is provided a reference element defining a physical value, and whereby the first reference signal is proportional to a third reference signal, and the second reference signal is proportional to the third reference signal and to the physical value defined by the reference element.

In other words, the first reference signal is selected to be proportional to a third reference signal, and the second reference signal is selected to be proportional to the third reference signal and also to the physical value determined by the reference element. It is advantageous here that excessively high accuracy requirements need not be made of the third reference signal since fluctuations are compensated for by the circuit.

In accordance with an additional feature of the invention, a current source outputs a current defining the second reference signal, and the current source is controlled by the third reference signal and has a transfer ratio determined by the reference element. This means that the second reference signal is given by a current which is generated by the current source which is controlled by the third reference signal and has a transfer ratio determined by the reference element.

In this case, the control signals may be given by currents which are provided by a current bank at the output of the regulating device. These currents may be in given ratios to one another which are determined by the current bank. As a result, fixed ratios between the parameters are set with high accuracy in a simple manner.

Accordingly, in another feature of the invention, a current bank is connected at an output of the regulating device; the current bank provides currents defining the control signals.

In accordance with again another feature of the invention, the currents defining the control signals have given ratios to one another, the ratios being determined by the current bank.

In accordance with a concomitant feature of the invention, the multipliers have differential amplifier stages driven by the input signals and are connected to receive a current which is proportional to the respective control current.

Again in other words, the multipliers may have differential amplifier stages which are driven by the input signals and are fed with a current which is proportional to the respective control current. Multipliers are realized in a simple manner by the differential amplifier stages, temperature influences and other effects being eliminated by the circuit according to the invention.

Other features which are considered as characteristic for the invention are set forth in the appended claims.

Although the invention is illustrated and described herein as embodied in a circuit configuration for adjusting parameters, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a circuit diagram of a specific embodiment of the invention.

DESCRIPTION OF THE PREFERRED EMBODIMENTS

Referring now to the sole FIGURE of the drawing in detail, there are seen three multipliers 1, 2, 3, which are each formed by a differential amplifier stage. The differential amplifier stages each comprise a pair of npn transistors 4, 5; 6, 7; 8, 9, the emitters of which are in each case coupled to one another and the collectors of which are connected to a supply potential 16 via a respective resistor 10 to 15. The base of one transistor 4, 6, 8 of the transistor pair of the differential amplifier stage is driven by an input signal 17, 18, 19, respectively. The bases of the respective other transistors 5, 7, 9 of the differential amplifier stage, whose collectors carry output signals 20, 21, 22, are connected to a reference-ground potential 23.

In addition, a further multiplier 25 is provided, which has two emitter-coupled npn transistors 26 and 27. The base of the transistor 27 is connected to the reference-ground potential 23, and the collectors of the two transistors 26 and 27 are connected to the positive supply potential 16 via a respective resistor 36 and 37. Just like the coupled emitters of the transistors 4, 5; 6, 7; 8, 9, the coupled emitters of the transistors 26 and 27 are connected to a negative supply potential 24 via a respective current source. The current sources are formed by the outputs of a current bank whose input path has an npn transistor 35 which is wired by connecting the base and emitter to form a forward-biased diode. The emitter of the transistor 35 is connected to the negative supply potential 24. The voltage drop across the collector-emitter path of the transistor 35 is added to the bases of the npn transistors 28 to 34, which act as output paths of the current bank.

Combining individual current outputs, for example, produces output currents which are in specific ratios to one another corresponding to the respectively combined outputs. Thus, in accordance with the exemplary embodiment, only one output path is provided in each of the multipliers 3 and 25. Those output paths are formed by the collector-emitter path of the transistors 34 and 28, respectively. Two output paths 32 and 33 are connected to the differential amplifier stage in the multiplier 2, and three are used for the multiplier 1. Therefore, the coupled emitters of the transistors 6 and 7 are coupled to the negative supply potential 24 via the collector-emitter paths of the transistors 32 and 33, which collector-emitter paths are connected in parallel with one another. The coupled emitters of the transistors 4 and 5 are correspondingly connected to the negative supply potential 24 via the collector-emitter paths of the transistors 29, 30, 31. Those collector-emitter paths are connected in parallel with one another. Accordingly, the input signals 17, 18, 19 are multiplied by parameters which are in the ratio 3:2:1 with respect to one another.

In order to eliminate temperature influences and other effects on the multipliers 1, 2, 3, the multiplier 25 is interconnected into a regulating circuit. The control variable thereby not only drives the multiplier 25 but also the multipliers 1, 2, 3.

The regulating circuit additionally contains a comparator 38 with a current output. The comparator compares the voltage drop across the resistor 37 with a voltage drop across a resistor 39 and feeds a current which is proportional to the voltage difference into the transistor 35. A reference voltage source 40 is furthermore provided, which, on the one hand, feeds a voltage divider comprising two resistors 41 and 42 and, on the other hand, controls a current source. The current source contains an operational amplifier 43, whose non-inverting input is connected to a terminal of the reference voltage source 40. The inverting input of the operational amplifier 43 is connected to a terminal of a resistor 44, whose other terminal, just like a terminal of the resistor 42 and of the reference voltage source 40, is connected to the negative supply potential 24. The inverting input of the operational amplifier 43 is additionally connected to the emitter of a transistor 45, whose base is connected to the output of the operational amplifier 43 and whose collector is coupled on the one hand to an input of the comparator 38 as well as to a terminal of the resistor 39. The other terminal of the resistor 39 is connected to the positive supply potential 16. Finally, the tap of the voltage divider is connected to the base of the transistor 26.

The transconductance (slope) of the differential amplifier stages used in the multipliers 1, 2, 3, 25 depends on the respective control current fed into the coupled emitters and is set by the regulating circuit such that the transconductance is inversely proportional to a value Re. The resistor 44 is provided for setting the desired signal. A voltage which is equal to the voltage Ur output by the reference voltage source 40 is present across the resistor 44. Consequently, a current Is, which is equal to the ratio of the voltage Ur to the resistance Re is fed into the resistor 39. The multiplier 25, which is constructed identically to the multipliers 1, 2, 3, is supplied on the input side with a voltage which is equal to the voltage Ur multiplied by an attenuation factor. The attenuation factor is produced from the resistances R1 and R2 of the resistors 41 and 42. It is equal to the resistance R1 divided by the sum of the resistances R1 and R2. Together with the transconductance G of the multiplier 25, the following voltage Ui is produced across the resistor 37:

$$Ui = Ur \cdot \frac{R1}{R1 + R2} \cdot R4,$$

where R4 represents the resistance of the resistor 37. The actual voltage Ui is compared with a desired voltage Us. In this case, $$Us = \frac{Ur}{Re} \cdot R3,$$

where R3 represents the resistance of the resistor 39. The regulating circuit then sets the current Is in such a way that the actual voltage Ui is equal to the desired voltage Us. It follows directly from this that $$\frac{R1}{R1 + R2} \cdot G \cdot R4 = \frac{1}{Re} \cdot R3.$$

The resultant transconductance G is therefore defined only by exactly defined resistance ratios and also an external reference resistor (44) and is at the same time independent of the voltage Ur of the reference voltage source 40.

If a comparison device 38 with current inputs is used, then it is additionally possible to dispense with the resistors 37 and 39 and to feed the currents flowing through each of them directly into the comparator 38. The ratios between the transconductances of the individual differential amplifier stages can be set in a simple manner by way of the ratios of the corresponding output currents of the current bank. Finally, the differential amplifier stages, like other circuit sections, too, can be operated symmetrically.

I claim:

1. A circuit configuration for parameter adjustment, comprising:

at least one first analog multiplier connected to receive an input signal and a first control signal corresponding to a parameter, and outputting an output signal;

a second multiplier identical to said at least one first multiplier, said second multiplier being connected to receive a first reference signal and a second control signal corresponding to the first control signal, and outputting an output signal; and a regulating device connected to said at least one first multiplier and to said second multiplier, said regulating device receiving and comparing the output signal of said second multiplier and a second reference signal, and deriving therefrom control signals for said multipliers.

2. The circuit configuration according to claim 1, which further comprises a reference element defining a physical value, and whereby the first reference signal is proportional to a third reference signal, and the second reference signal is proportional to the third reference signal and to the physical value defined by said reference element.

3. The circuit configuration according to claim 2, which further comprises a current source outputting a current defining the second reference signal, said current source being controlled by the third reference signal and having a translation ratio determined by said reference element.

4. The circuit configuration according to claim 3, which further comprises a current bank connected at an output of said regulating device, said current bank providing currents defining the control signals.

5. The circuit configuration according to claim 4, wherein the currents defining the control signals have given ratios to one another, the ratios being determined by the current bank.

6. The circuit configuration according to claim 1, wherein said multipliers have differential amplifier stages driven by the input signals and connected to receive a current which is proportional to the respective control current.

* * * * *